United States Patent
Kallos et al.

(10) Patent No.: US 12,137,119 B2
(45) Date of Patent: Nov. 5, 2024

(54) CRYPTO-JACKING DETECTION

(71) Applicant: British Telecommunications Public Limited Company, London (GB)

(72) Inventors: George Kallos, London (GB); Fadi El-Moussa, London (GB)

(73) Assignee: British Telecommunications Public Limited Company (GB)

( * ) Notice: Subject to any disclaimer, the term of this patent is extended or adjusted under 35 U.S.C. 154(b) by 309 days.

(21) Appl. No.: 17/758,386

(22) PCT Filed: Dec. 18, 2020

(86) PCT No.: PCT/EP2020/087114
§ 371 (c)(1),
(2) Date: Jul. 5, 2022

(87) PCT Pub. No.: WO2021/140007
PCT Pub. Date: Jul. 15, 2021

(65) Prior Publication Data
US 2022/0377109 A1      Nov. 24, 2022

(30) Foreign Application Priority Data
Jan. 6, 2020   (GB) ..................................... 2000128

(51) Int. Cl.
*H04L 9/00*   (2022.01)
*G06F 18/214*   (2023.01)
(Continued)

(52) U.S. Cl.
CPC ........ *H04L 63/1483* (2013.01); *G06F 18/214* (2023.01); *H04L 9/3236* (2013.01); *H04L 63/1416* (2013.01)

(58) Field of Classification Search
CPC ............... H04L 63/1483; H04L 9/3236; H04L 63/1416; G06F 18/214
(Continued)

(56) References Cited

U.S. PATENT DOCUMENTS 7,401,294 B2 *   7/2008   Chang ................... G06F 16/954
                                                                      715/779
8,997,220 B2      3/2015   Yu et al.
(Continued)

FOREIGN PATENT DOCUMENTS

WO        2021140007 A1     7/2021

OTHER PUBLICATIONS

Examination Report and Notification Intention to Grant received for Great Britain Patent Application No. 2000128.5, mailed on Sep. 14, 2022, 2 pages.
(Continued)

*Primary Examiner* — Haresh N Patel
(74) *Attorney, Agent, or Firm* — Pranger Law PC

(57) ABSTRACT

A method of detecting blockchain miner code executing in a web browser including receiving a profile for the browser identifying typical resource consumption by the browser in use; responsive to a detection of a deviation of the resource consumption by the browser from the profile, intercepting a communication with the browser including a cryptographic nonce, training a plurality of classifiers based on generated training examples, each training example being generated by applying a hashing algorithm to the nonce such that each classifier is trained with training examples generated using a different hashing algorithm; intercepting one or more second communications with the browser, each of the second communications including a hash value; executing at least a subset of the classifiers based on the hash value of
(Continued)

each of the second communications; and identifying malicious miner code executing in the browser.

9 Claims, 2 Drawing Sheets

(51) Int. Cl.
  *H04L 9/32* (2006.01)
  *H04L 9/40* (2022.01)
(58) Field of Classification Search
  USPC .......................................................... 726/22
  See application file for complete search history.

(56) References Cited

U.S. PATENT DOCUMENTS

| | | | |
|---|---|---|---|
| 10,291,640 | B2 | 5/2019 | Kupreev et al. |
| 11,070,632 | B2* | 7/2021 | Badyan ............... H04L 63/1408 |
| 11,334,329 | B2* | 5/2022 | Du .......................... G06F 8/447 |
| 11,373,007 | B2* | 6/2022 | Beaumont ........... H04L 63/1433 |
| 2005/0278290 | A1* | 12/2005 | Bruce ................... G06F 16/283 |
| 2008/0270189 | A1* | 10/2008 | Howard ................. G16H 10/60 705/14.19 |
| 2011/0107080 | A1* | 5/2011 | Ohbitsu ............... H04N 21/488 713/150 |
| 2015/0242470 | A1* | 8/2015 | Ben-Itzhak ............ G06Q 30/02 707/722 |
| 2018/0225189 | A1* | 8/2018 | Putra ................... G06F 11/3072 |
| 2018/0255090 | A1* | 9/2018 | Kozloski ................. H04L 67/02 |
| 2019/0243946 | A1* | 8/2019 | Postrel .................... C40B 30/00 |
| 2019/0306137 | A1* | 10/2019 | Isaacson ................ G06Q 20/12 |
| 2019/0364057 | A1 | 11/2019 | Hazay et al. |
| 2020/0175506 | A1* | 6/2020 | Snow ................. G06Q 20/0655 |

OTHER PUBLICATIONS

International Preliminary Report on Patentability received for PCT Patent Application No. PCT/EP2020/087114, mailed on Jul. 21, 2022, 13 pages.

Antonopoulos A.M., "Mastering Bitcoin, Unlocking Digital Crypto-Currencies," O'Reilly Media, Apr. 2014, 282 pages.

Conti M., et al., "Detecting Covert Cryptomining using HPC," arxiv.org, Aug. 31, 2019, 20 pages.

Creatonics. "What is a Bitcoin Hash?," Coinsutra, Sep. 6, 2019, available from https://coinsutra.com/bitcoin-hash/, 8 pages.

Dashevskyi S., et al., "Dissecting Android Cryptocurrency Miners," Proceedings of the Tenth ACM Conference on Data and Application Security and Privacy, Mar. 16, 2020, pp. 191-202.

Dragos D., et al., "Crypto-Mining Application Fingerprinting Method," 2018 International Conference on Communications (COMM), Jun. 14-16, 2018.

Dwi Yulianto A., et al., "Mitigation of Cryptojacking Attacks Using Taint Analysis," 2019 4th International Conference on Information Technology, Information Systems and Electrical Engineering (ICITISEE), Nov. 2019, pp. 234-238.

Hong G., et al., "How You Get Shot in the Back: A Systematical Study about Cryptojacking in the Real World," CCS '18: Proceedings of the 2018 ACM SIGSAC Conference on Computer and Communications Security, Oct. 2018, pp. 1701-1713.

International Search Report and Written Opinion for Application No. PCT/EP2020/087114 mailed on Mar. 16, 2021, 17 pages.

Kharraz A., et al., "Outguard: Detecting In-Browser Covert Cryptocurrency Mining in the Wild," WWW '19: The World Wide Web Conference, May 2019, pp. 840-852.

Munoz J.Z., et al., "Detecting Cryptocurrency Miners with NetFlow/IPFIX Network Measurements," 2019 IEEE International Symposium on Measurements & Networking (M&N), Jul. 8-10, 2019.

Musch M., et al., "Web-based Cryptojacking in the Wild," arxiv.org, Aug. 28, 2018, 34 pages.

Pastor A., et al., "Detection of Encrypted Cryptomining Malware Connections With Machine and Deep Learning," IEEE Access, Aug. 25, 2020, vol. 8, pp. 158036-158055.

Saad M., et al., "End-to-End Analysis of In-Browser Cryptojacking," arxiv.org, Sep. 6, 2018, 15 pages.

Search Report under Section 17(5) for Great Britain Application No. 2000128.5, mailed on Jun. 26, 2020, 4 pages.

* cited by examiner

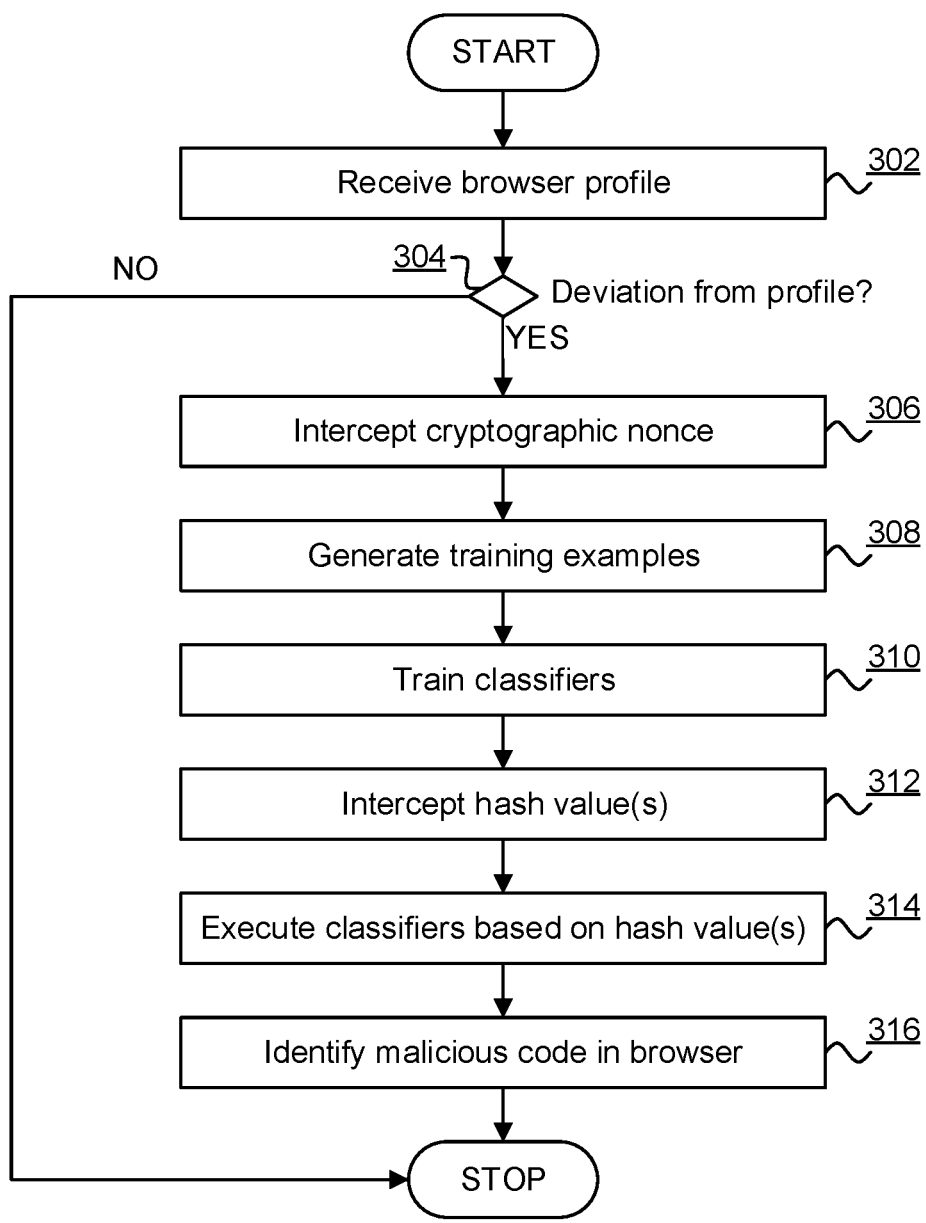

CRYPTO-JACKING DETECTION

PRIORITY CLAIM

The present application is a National Phase entry of PCT Application No. PCT/EP2020/087114, filed Dec. 18, 2020, which claims priority from GB Patent Application No. 2000128.5, filed Jan. 6, 2020, each which is hereby fully incorporated herein by reference.

TECHNICAL FIELD

The present disclosure relates to the detection of crypto-jacking.

BACKGROUND

So called "crypto-jacking" malware is malicious software that consumes one or more of a target computer system's processing, memory and network resources to perform blockchain mining functions on behalf of a malicious controlling or source entity. The blockchain mining functions can be beneficial as part of a wider network attack (such as a "51-percent attack" for influencing the state of a distributed transactional database such as a blockchain) and/or for the generation of crypto-currency.

A crypto-jacking attack involves the communication of executable code or script to the target system through an infected webserver or web intermediary. A webpage retrieved by a target browser can include, for example, JavaScript that is configured to access and retrieve miner code for execution within the browser of the target. The functions of the miner involve performing mathematical hashing operations on a received data item (a "nonce") for a candidate block in the blockchain which can be conducted entirely within the sandbox of the browser.

It would be beneficial to provide for the detection of deviant browser behavior indicative of such infection and to identify a type of infection to inform remediation.

SUMMARY

According to a first aspect of the present disclosure, there is provided a computer implemented method of detecting blockchain miner code executing in a web browser comprising: receiving a profile for the browser identifying typical resource consumption by the browser in use; responsive to a detection of a deviation of the resource consumption by the browser from the profile, intercepting a communication with the browser including a cryptographic nonce, training a plurality of classifiers based on generated training examples, each training example being generated by applying a hashing algorithm to the nonce such that each classifier is trained with training examples generated using a different hashing algorithm; intercepting one or more second communications with the browser, each of the second communications including a hash value; executing at least a subset of the classifiers based on the hash value of each of the second communications; and identifying malicious miner code executing in the browser based on the classifications of the at least a subset of classifiers.

In some embodiments, the method further comprises: storing network communication between the browser and a remote entity, and wherein intercepting a communication to the browser including a cryptographic nonce includes analyzing the stored network communication for a connection-setup portion of a communication between code executed by the browser and the remote entity to identify a communication received by the code including the cryptographic nonce as a payload of the communication.

In some embodiments, intercepting the second communications includes analyzing the stored network communication for a communication between code executed by the browser and the remote entity to identify a communication sent by the code including a hash value as a payload of the communication.

In some embodiments, the identification of malicious miner code executing in the browser includes identifying a hashing algorithm associated with a classifier.

In some embodiments, the identified hashing algorithm indicates a type of the malicious miner code executing in the browser, and the method further comprising triggering a responsive action, the responsive action being determined based on the indicated type.

In some embodiments, the method further comprises triggering a responsive action to the identified miner code including one or more of: terminating the browser; terminating the execution of the miner code in the browser; commencing or increasing a monitoring function to monitor the browser and/or data communicated therewith; blocking communications with a remote network address associated with a web page loaded by the browser; and terminating the execution of scripts by browser.

In some embodiments, the profile for the browser includes a clustered model of resource consumptions of the browser in use, and detecting the deviation of the resource consumption by the browser is based on the clustered model.

According to a second aspect of the present disclosure, there is provided a computer system including a processor and memory storing computer program code for performing the method set out above.

According to a third aspect of the present disclosure, there is provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which:

FIG. 3 is a flowchart of a method for detecting blockchain miner code executing in a web browser in accordance with an embodiment of the present disclosure.

DETAILED DESCRIPTION

Figure 1:
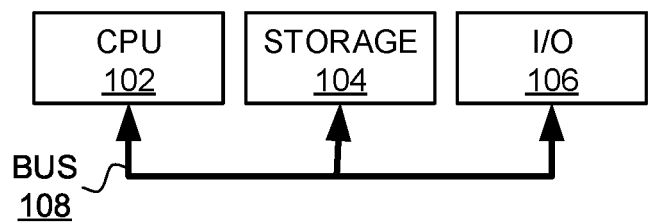
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
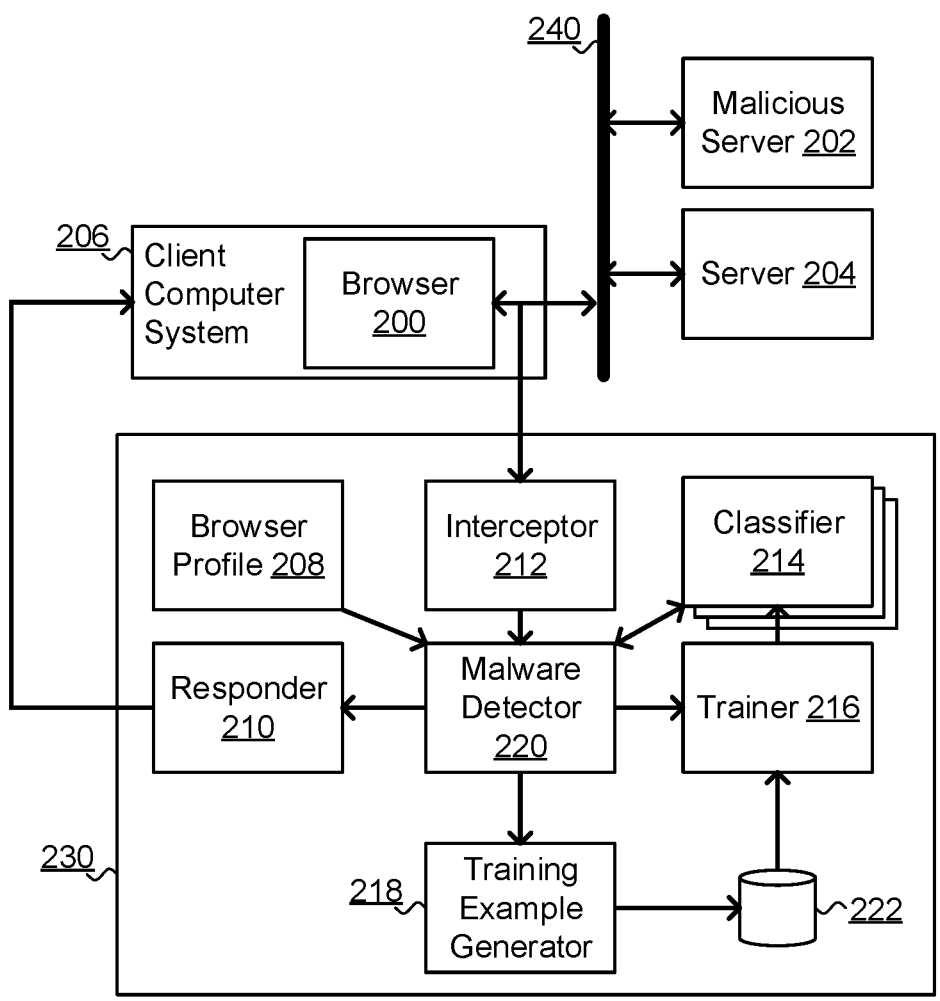
FIG. 2 is a component diagram of an arrangement for detecting blockchain miner code executing in a web browser in accordance with an embodiment of the present disclosure.

FIG. 2 is a component diagram of an arrangement for detecting blockchain miner code executing in a web browser in accordance with an embodiment of the present disclosure. Web browser 200 is a software component executing in a client computer system 206 as a physical or visualized-network-connected computer system. The browser 200 is operable to enter into network communication with a server 204 such as a web server or the like via a network 240, such as a wired, wireless, mobile or combination network. Thus, communications between the browser 200 and the server 204 can include, for example, hypertext transport protocol communications. A malware detection system 230 is indicated generally as a single system such as a physical or virtual computer system though it will be appreciated by those skilled in the art that components and aspects of the malware detection system 230 could alternatively be provided as separate components either individually or in groups or collectively, and any one or more of the components of the malware detection system 230 could be provided in, with or for the client computer system 206 such as part of a security facility or function of the computer system 206. Furthermore, any of the components of the malware detection system 230 indicated, described or illustrated separately with reference to FIG. 2 could alternatively be combined into common or like components.

The malware detection system 230 includes a malware detector 220 as a hardware, software, firmware or combination component arranged to provide malware detection facilities in accordance with embodiments of the present disclosure. The malware detector 220 accesses a browser profile 208 identifying typical resource consumption by the browser 200 in use. The browser profile 208 can be predefined based on the execution of the browser 200 in use, or alternatively the malware detector 220 can be configured to trigger or request the generation of the browser profile 208 at a runtime of the malware detector 220.

Typical resource consumption of the browser 200 can be identified in the browser profile 208 for resources of the computer system 206 including, for example, inter alia, one or more of: memory; storage; processor; and network resources of the computer system 206. In one embodiment, the browser profile 208 includes indications of typical resource consumption by the browser 200 in multiple use-cases or contexts. For example, typical resource consumption by the browser 200 can include resource consumption during: accessing, loading and rendering text-based web pages; accessing, loading and rendering image-based web pages; accessing, loading and rendering video-based web pages; accessing, loading and rendering audio-based web pages; accessing, loading and rendering web pages including scripts such as JavaScript; and accessing, loading and rendering composite web pages including some combination of one or more of text, image, video, audio and script content. For example, resource consumption for each context can be measured based on typical use-case of the browser 200 in use in communication with one or more web servers. Resource consumption can be measured literally (e.g. memory consumption, percentage of processor utilization) and may be converted or normalized normalised for ready comparison.

In one embodiment, the resource consumption associated with each of one or more use contexts of the browser 200 are clustered using a clustering method such as k-means clustering so as to generate a clustered model of resource consumption of the browser 200 in use. In some embodiments, such a clustered model of resource consumption is used to identify average, mean or centroid resource consumption metrics for representation of typical resource consumption.

In use, the malware detector 220 monitors the browser 200 to detect a deviation of execution of the browser 200 from the browser profile 208. For example, deviation of resource consumption by the browser 200 from typical resource consumptions indicated in the profile 208 can be detected. Where the profile uses a clustered model, a resource consumption of the browser 200 that, when modelled in the clustered model, constitutes an outlier in the model can serve to identify such a deviation.

On detection of such deviation, the malware detector 220 is further operable with an interceptor 212 component as a hardware, software, firmware or combination component arranged to intercept communication occurring with the browser 200 such as communication sent or received by the browser via the network 240. The interceptor 212 can include one or more functions or features of the browser 200 such as a network logging or tracing feature, or alternatively the interceptor 212 can be external to the browser 200 such as a network monitoring, snooping or sniffing tool. Initially, the interceptor 212 is used to intercept a communication to the browser including a cryptographic "nonce". Such a nonce is communicated by a malicious server 202 to the browser 200 when the browser executes blockchain miner code such as blockchain miner script code or the like. Thus, such communication can be suspected based on the presence of network communication received by the browser 200 originating from a network connected device that is not the web server 204, such as a malicious server 202. Furthermore, the malicious communication of such a nonce will occur during an initial portion of communication between code executing in the browser 200 and the malicious server 202 referred to herein as a setup portion of communication. That includes an initial number of messages communicated therebetween of which the payload of a message received by the browser 200 from the malicious server 202 includes the nonce value.

On receiving the cryptographic nonce, the malware detector 220 is operable to trigger the generation of training examples for a plurality of classifiers 214. The classifiers 214 are machine learning components suitable for generating a classification as an output based on an input set of parameters. For example, each classifier 214 is implemented as a neural network, autoencoder or support vector machine, though other suitable classifiers are and may become available. Each classifier 214 is configured to accept, as an input data set, a data structure corresponding to a hash value generated by blockchain miner code using a hashing algorithm. In particular, each classifier 214 is specific to a particular hashing algorithm. Thus, the malware detector 220 initially triggers a training example generator 218 component to generate a repository 222 of training examples for training the classifiers 214. The training examples for each classifier 214 are generated by hashing the nonce value using a cryptographic hashing function specific to the classifier 214. In some embodiments, the classifier is arranged to received input data as a vector or matrix format and training examples can therefore be encoded as vectors or matrices using, for example, a one-hot encoding scheme according to which each value in a hash is encoded to a vector having a position for every possible symbol in an alphabet for the value.

Once generated, the repository 222 of training examples are used by a trainer 216 component to train each of the classifiers 214. In some embodiments, the classifiers 214 are trained using an unsupervised or semi-supervised technique such that each classifier 214 is trained based on training examples for a particular hashing function so as to reinforce recognition of hash values arising from the hashing function. In this way, each classifier 214, when trained, is suitable for indicating a degree of likelihood that a hash value was generated by a hashing algorithm associated with the classifier 214.

The malware detector 220 is further operable to receive one or more further communications from with the browser 200 including a hash value. Such communications can be identified based on, for example, a remote server such as the malicious server 202 involved in the communication. A payload of each intercepted communication including a hash value is identified, such intercepted hash value being generated by blockchain miner code executing in the browser 200. Subsequently, the malware detector 220 triggers the execution of each of the classifiers 214 using each of the one or more intercepted hash values so as to determine a degree, extent, measure or confidence of classification of each intercepted hash value by each classifier 214.

Where a classifier 214 classifies an intercepted hash value to a predetermined extent, threshold or similar, the presence of malicious blockchain miner code executing in the browser 200 is determined. In particular, blockchain miner code utilizing a hashing algorithm associated with the classifying classifier 200 is determined. Accordingly, an identified hashing algorithm can indicate a type of the malicious miner code executing in the browser 200.

In one embodiment, a responder component 210 as a hardware, software, firmware or combination component, is responsive to an identification by the malware detector 220 of malicious miner code executing in the browser 200. The responder 210 is configured to undertake a responsive action including, for example, one or more of: terminating the browser 200; terminating the execution of the miner code in the browser 200; commencing or increasing a monitoring function to monitor the browser 200 and/or data communicated therewith; blocking communications with a remote network address associated with a web page loaded by the browser 200, such as an address of the malicious server 202; and terminating the execution of scripts by browser 200. In one embodiment, the responsive action(s) performed by the responder 210 are determined on the basis of the type of the malicious miner code determined based on a hashing algorithm associated with a classifying classifier 200.

The process of detecting a deviation of the resource consumption by the browser 200 from the browser profile 208 can occur during or after the communication of a nonce and/or hash values between the browser 200 and the malicious server 202, and thus subsequent interception of communication by the interceptor 212 may fail to identify the nonce and/or hash values. To overcome this, in one embodiment, network communication between the browser and the network (or any remote entity such as the server 204 and/or malicious server 202) are stored, such as by being stored by the interceptor 212. Thus, stored network communication can be subsequently analyzed by the interceptor 212 and/or malware detector 220 to identify the nonce and/or hash values.

FIG. 3 is a flowchart of a method for detecting blockchain miner code executing in a web browser in accordance with an embodiment of the present disclosure. Initially, at 302, the method receives the browser profile 208. At 304 the method determines if there is a deviation from the profile 208, and where a deviation is detected the method proceeds to 306 where a cryptographic nonce is intercepted in communication with the browser 200. At 308 training examples are generated for the classifiers 214 and the classifier is trained at 310. At 312 one or more hash values are intercepted in communication with the browser 200 and used as a basis for executing the classifiers at 314. At 316, classification by a classifier 214 identifies malicious code in the browser on which basis responsive actions can be triggered.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of detecting blockchain miner code executing in a web browser comprising:
   receiving a profile for the browser identifying typical resource consumption by the browser in use;
   responsive to a detection of a deviation of the resource consumption by the browser from the profile, intercepting a communication with the browser including a cryptographic nonce, training a plurality of classifiers based on generated training examples, each training example being generated by applying a hashing algorithm to the nonce such that each of the classifiers are trained with training examples generated using a different hashing algorithm;
   intercepting one or more second communications with the browser, each of the second communications including a hash value;
   executing at least a subset of the classifiers based on the hash value of each of the second communications; and identifying malicious miner code executing in the browser based on the classifications of the at least the subset of classifiers.

2. The method of claim 1 further comprising:
storing network communication between the browser and a remote entity, and
wherein intercepting a communication to the browser including a cryptographic nonce includes analysing the stored network communication for a connection-setup portion of a communication between code executed by the browser and the remote entity to identify a communication received by the code including the cryptographic nonce as a payload of the communication.

3. The method of claim 2 wherein intercepting the second communications includes analyzing the stored network communication for a communication between code executed by the browser and the remote entity to identify a communication sent by the code including a hash value as a payload of the communication.

4. The method of claim 1 wherein the identification of malicious miner code executing in the browser includes identifying a hashing algorithm associated with a classifier.

5. The method of claim 4 wherein the identified hashing algorithm indicates a type of the malicious miner code executing in the browser, and the method further comprising triggering a responsive action, the responsive action being determined based on the indicated type.

6. The method of claim 1 further comprising triggering a responsive action to the identified miner code including one or more of: terminating the browser; terminating the execution of the miner code in the browser; commencing or increasing a monitoring function to monitor the browser or data communicated therewith; blocking communications with a remote network address associated with a web page loaded by the browser; and terminating the execution of scripts by browser.

7. The method of claim 1 wherein the profile for the browser includes a clustered model of resource consumptions of the browser in use, and detecting the deviation of the resource consumption by the browser is based on the clustered model.

8. A computer system including a processor and a memory storing computer program code for performing the method of claim 1.

9. A non-transitory computer readable medium comprising computer program code to, when loaded into a computer system and executed thereon, cause the computer system to perform the method of claim 1.

* * * * *